Patented May 30, 1939

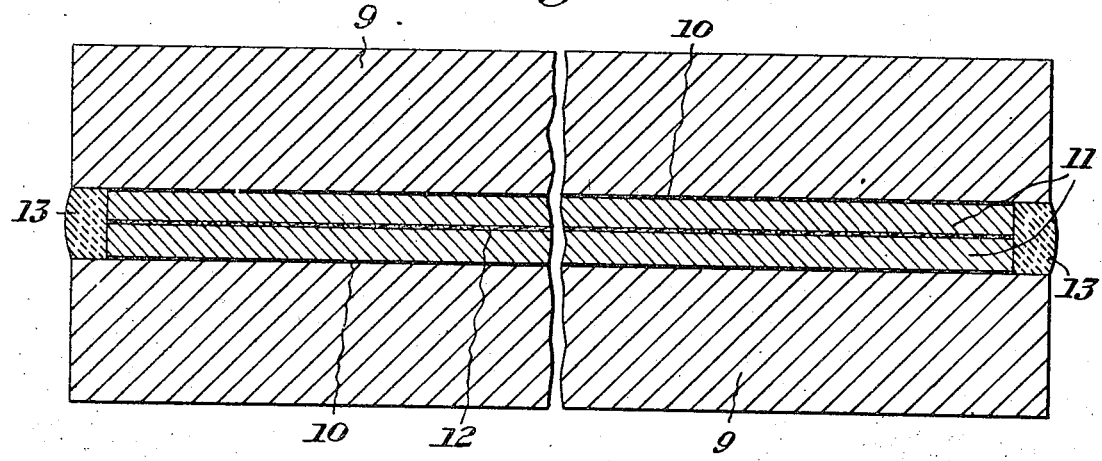
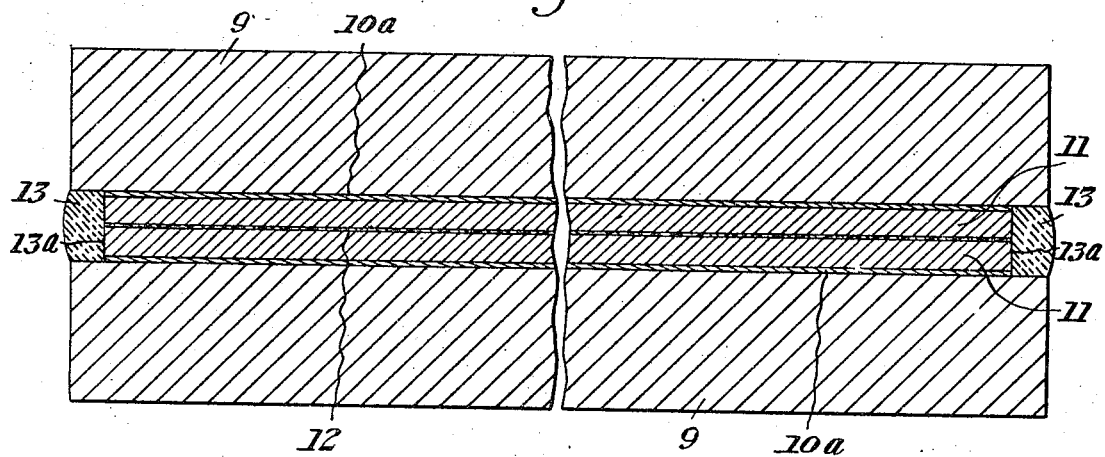
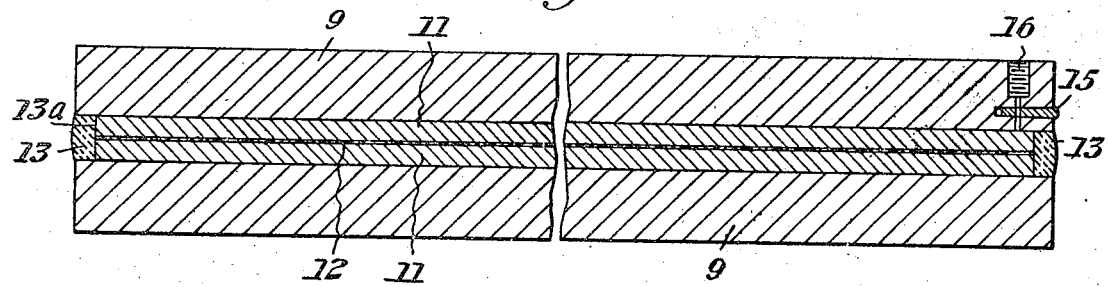

2,160,558

UNITED STATES PATENT OFFICE 2,160,558

MAKING COMPOSITE METALS

John B. Orr, Jr., Edgeworth, Pa.

Application May 27, 1936, Serial No. 82,160
Renewed October 31, 1938

24 Claims. (Cl. 29—189)

This invention relates to the making of composite metal materials such as sheets, strips, and/or plates and more particularly, to the obtaining of an effective molecular action between two or more metal members being fabricated to form a composite member.

In one aspect, my invention deals with an improved procedure for providing composite materials made up of metal members of somewhat different properties. In another aspect, my invention involves a procedure for successfully fabricating a composite sheet having carbon steel and non-corrosive steel layers or members.

Composite sheet containing, for example, 85% carbon steel and 15% non-corrosive steel, will have great commercial value provided it can be effectively fabricated without too much expense. Many attempts have been made to successfully produce such a product at a reasonable cost, but previous to my invention, these attempts have not been successful. Besides the difficulty encountered in properly rolling non-corrosive and/or stainless steels, considerable difficulty arises in connection with the proper welding of one layer to another. That is, it has been impossible to obtain, previous to the present invention, a commercially practical composite sheet made up of two or more layers of metals of somewhat unlike characteristics, such as carbon steel and non-corrosive or stainless steel. I believe this has been to a great extent due to the fact that the necessary physical adherence cannot be attained between layers. It is much more difficult to properly weld non-corrosive, stainless, and other special steels to a carbon steel than to weld carbon steels together; there seems to be a greater molecular attraction in the latter case. Thus, special precautions have been taken in attempting to weld steel layers of dissimilar characteristics into a composite member or sheet.

One method has been to assemble two plates or slabs of non-corrosive steel and to place them face to face, separating them by a layer of refractory material. These plates are then surrounded with low carbon steel either by pouring molten metal completely around them or by placing two thick slabs of low carbon steel on each side of them and welding the cracks adjacent the edges of the layers. Although this method did to a certain extent exclude the entry of additional oxygen during the rolling operation, yet I have found that the metal becomes more or less porous during the hot rolling or working operation and tends to absorb oxygen from the atmosphere; then, too, it is difficult to obtain an absolutely gas-tight weld. I have found that this method has not been successful due to the fact that scale forms between the non-corrosive layers and the carbon steel layers preventing effective molecular welding action therebetween. Oxides seem to more readily form on non-corrosive steels, and when formed, they are much more difficult to remove.

An investigator sensed that the oxygen present was perhaps a contributing agency as far as the formation of a scale-bearing oxide was concerned. To in some manner take care of the oxygen which was present when the pack was closed by the welding operation, he introduced a strip of magnesium into the package or closure and in accordance with the theory, this magnesium was supposed to flare and combine with all of the oxygen therein to form magnesia and a partial vacuum. However, this method was not commercially successful and I believe there are three particular reasons for this. In the first place, the investigator did not recognize the fact that oxygen very readily enters the pack even although it is enclosed during a hot working operation, and in the second place, the magnesium did not always function in the manner contemplated. In the third place, in those cases where the magnesium did actually flare and form magnesia, the magnesia constituted a deposit which in itself was not conducive to the effective welding of the sheets and tended to produce irregularities on their surfaces.

It has been an object of my invention to determine the reasons why previous to the present invention, those skilled in the art have been unable to produce a successful commercial article of composite metal such as carbon steel and a non-corrosive or stainless steel.

Another object of my invention has been to eliminate the troubles previously encountered by those skilled in the art by practical application of the herein mentioned discoveries.

A further object of my invention has been to provide a procedure for removing oxygen enclosed in a package or pack comprising two or more layers or sheets prior to and during a hot working operation.

A still further object of my invention has been to provide a composite metal member or article whose layers are uniformly adherent.

These and many other objects of my invention will appear to those skilled in the art from the description thereof taken in view of the drawing and the appended claims.

I have enclosed a pack of metal layers and pumped the air out through a vent hole to produce a vacuum. After the vent was closed, I then rolled the pack. However, this method has limitations. I have done considerable research work in order to determine the cause of these limitations and to provide a procedure that may successfully be employed to produce a commercial type of composite article from layers of metal having a wide range of element combination as well as a wide range of characteristics.

I discovered that when a non-corrosive steel layer of less than .10% carbon was used in combination with a carbon steel layer of less than .15 to .25% carbon, the results were unsatisfactory. I then came to the realization that the carbon content of the steels to be welded was the real answer to the problem. I also found that the carbon has more affinity for any oxygen present, either in the form of a metallic oxide or as a free gas, than it has for a given metal. I determined that it was necessary to provide sufficient carbon either in the free state or in one of the metal layers to combine with any oxygen present and with any that might attempt to enter during the hot rolling operation. I also found out that there should be an excess of carbon with respect to the oxygen, in order that the non-oxidizing gas, carbon monoxide, will be formed. In an experiment, a bar containing .10% carbon was placed in a tube and a few inches away from it, a small amount of amorphous carbon was placed in a crucible. The carbon was raised to between 600–700° C. The result was that the scale was completely reduced to metal on the bar and some quantities of carbon monoxide gas were given off. The reaction starts in at around 600° and progresses at a very rapid rate over 700° C.

Thus, in accordance with the principles of my invention, I provide a commercial package made up of non-corrosive and carbon steel sheets placed face to face, or in other words, with their faces in adjacent relationship, and then place a thin sheet of high carbon steel, say, from .50 to 1% carbon and of a thickness of 1 to 2% of the total thickness of the assembly between the surfaces to be welded. In another embodiment of my invention, I provide a thin layer of lamp black which is spread between such surfaces. The carbon contained in the carbonaceous material or in the pure carbon layer will combine with any oxygen that may enter the assembly or that may be present in the assembly either in the form of free oxygen or in the form of manganese, iron, chromium, nickel and other types of metal oxides, and also will combine with any oxygen which may try to enter the assembly during the heating and the hot working operations. This carbon is sufficiently in excess to form carbon monoxide; it turns the oxide into pure metal and makes a lustrous, smooth surface which enables the molecules of adjacent shapes or layers to come into close and effective welding contact. In the course of time, the carbon monoxide will completely fill the entire package or closure at a pressure equal to or greater than the surrounding atmospheric pressure to prevent the entrance of more oxygen. Thus, oxygen early entering the pack combines with the carbon to form a gas that tends to prevent the later entry of more oxygen. By my invention, I have made it possible to effectively weld non-corrosive and stainless steels to carbon steel as effectively, if not more effectively, than is now possible in welding similar high carbon steels together.

It is preferable to place carbon in the pack in excess of mechanical requirements of the suitable metal members in order that carbon monoxide gas will evolve. In other words, the carbon acts as a reducing agent for the oxygen in or entering the pack and by reason of its quantity, provides carbon monoxide gas which replaces the oxygen in the pack.

Previous to my invention, carbon has been introduced into a heating chamber to increase the carbon content of an open pile of plates. Oxygen was excluded to prevent oxidation of the carbon, in order that it might be employed to increase the carbon content of the plates, and thus, to reduce the fusion temperature of the metal. As distinguished from this, I introduce carbon into a sealed or closed pack of plates and employ it to destroy the metal oxides, to in effect, absorb oxygen, and to prevent other oxygen from combining with elements present in the plates to form objectionable oxides, and thus, scale. I have found that although sandblasting and/or pickling the members of the pack prior to piling them will decrease the work of the carbon, that carbon so effectively cleans the members of a closed pack that the formerly required steps become no longer necessary. Upon cutting a pack open after it has been heated to a temperature and for a time sufficient to bring about a thorough carbon-oxidizing reaction, I found that all of the scale had disappeared and that the members had exceptionally bright silvery surfaces.

In welding composite steels in this manner, it has been found that there is little carbon migration from the high carbon sheet into the low carbon or non-corrosive sheet and that any migration that exists is into the low carbon steel and is not detrimental since the percentage of high carbon steel is so small that an average increase of over .01% in the low carbon steel is impossible. With this method, oxides are not only prevented from forming on the inside surfaces of the package, but any oxides which are left on the plates or slabs are reduced and absolutely chemically cleaned surfaces are provided; there is nothing that prevents physical contact between the molecules of each layer or sheet with respect to each other.

I was lead to a solution of the problems involved from a study of the large areas of oxides that appeared at the edges and corners of the sheets. This phenomenon was rather difficult to understand, but I reasoned and later determined that the oxygen filtered in through the welded edges of the pack and naturally the first areas to be oxidized were those which the oxygen first contacted. Little of the oxygen actually reached the center of the package with moderate infiltration, since it was exhausted before it reached that point.

I also contemplate filling the packages or closures with non-oxidizing gases such as natural gas, a mixture of methane and ethane with some heavier hydrocarbons, carbon monoxide, carbon tetrachloride, and steam. These gases will keep the surface of the steel to be welded free from oxides and will prevent the entrance of oxygen through minute leaks in the welded areas provided they are kept at a pressure slightly greater than the atmospheric pressure. However, it is necessary to use care in heating the packages to make sure that the temperature of the gas inside the packages is always rising; any drop in temperture would cause the gas to contract, reducing the pressure and allowing some infiltration of oxygen. However, this method has the objection that if some oxides are left on the surface of the steel during assembly of the packages, the non-oxidizing gases will not remove that scale and thus produce chemically clean surfaces after the heating operations.

When free carbon or high carbon sheets and some carbonaceous material are placed within the package, there is no danger of building up an excess of gas pressure, for if there are no leaks in the welded areas, there will be no infiltration of oxygen and no carbon monoxide gas will be formed, except that which may be produced from oxygen retained in minute particles of scale not cleaned from the metal surfaces before assembling the package. If there is some infiltration of oxygen and the production of appreciable amounts of carbon monoxide, the gas pressure within the assembly cannot become greater than the atmospheric pressure, since the leaks in the welds will enable it to escape. This carbon effectively reduces all various types of metal oxides, such as iron, chromium, manganese, vanadium, tungsten, and molybdenum.

The process is not limited to packages or closures formed by welding carbon steel slabs around non-corrosive steel plates, but may be also effectively utilized where carbon steel is poured around non-corrosive plates in an ingot mold. Two sheets of high carbon steel are rolled and welded to the sides of the non-corrosive plates after they have been coated with a mixture of carbon and oil in sufficient quantities to reduce all oxides and combine with any oxygen that may be entrapped by the poured metal.

In the drawing appended hereto for the purpose of illustrating my invention—

Figure 1 is a cross-sectional view taken through a pile or package made up in accordance with the principles of my invention;

Figure 2 is a similar cross-sectional view in elevation of a pack of slightly modified construction; and Figure 3 is a sectional view in elevation of an enclosure showing another modification of my invention.

In Figure 1, I have shown a pair of low carbon steel plates or slabs 9 which form facings for an inner pair of non-corrosive or stainless steel plates or slabs 11. As seen, a weld-preventing layer 12 of insulating material such as a red lead, magnesium, chromium, or aluminum oxide with a binder such as water glass is provided between opposite faces of the inner or non-corrosive pair of sheets 11. A thickness of amorphous carbon 10 is provided between the outer faces of the sheets 11 and the inner faces of the sheets 9. This carbon is preferably dry carbon to prevent the formation of moisture in the pack and may be applied by a reducing flame of the welding torch. As shown, the non-corrosive members 11 are shorter in width and length and smaller in thickness than the carbon steel members 9. However, this is not a requisite, but is advantageous since it is desirable to employ as thin a sheet of non-corrosive steel as possible in view of the expense involved and also in view of other considerations. It is also advantageous to make the non-corrosive sheets slightly shorter at their edges than the outer or carbon sheets, in order that a weld 13 may be applied to fill the spacing between the edge ends of the non-corrosive sheets and the edge ends of the carbon sheets.

In Figure 2 I have shown a thin high carbon sheet 10a positioned between each non-corrosive sheet and its associated low carbon sheet 9. This method also makes possible an effective welding action.

In Figure 3 I have somewhat diagrammatically shown a tapered pin 15 and a vacuum connection 16, in order that the space between the sheets may be evacuated. This particular method is advantageous where a separate layer of carbon is not provided and where dependency is placed upon the carbon content of the steel plates for the carbon which is to be employed in forming the carbon monoxide. That is, if the pack or group is substantially evacuated prior to the heating operation, less carbon will be required, since only a slight amount of scale-bearing oxide must be reduced. This connection is used for applying vacuum and for drawing any air and gases from the closure after it is welded together and before it is rolled.

The pack or group is trimmed after it has been rolled sufficiently to provide a desired elongation and to weld together the carbon steel members 10 and the non-corrosive or stainless steel members 11. The edges are preferably cut along the inner plane of the weld 13a and along the plane of the welding-preventing material 12. In this manner two composite members are provided, each of which has at least one surface covered with a layer of stainless or non-corrosive steel.

The carbon reaction begins at about 1200° F. And, since an average rolling temperature is around 2100° F. and the welding temperature is about 1900–2250° F., it will be seen that carbon monoxide will readily form when the pack is heated to a hot working temperature and when it is being welded and/or hot rolled.

I have also found that the weld-preventing layer may itself tend to release oxygen to the detriment of the composite structure. That is, certain types of weld-preventing layers, when heated, either at the time the carbon is heated or during the hot working of the pack, give off oxygen. This oxygen of course combines with the metal of the members or plates of the pack to form metal oxides or scale which, as previously pointed out, must be avoided.

Other weld-preventing layers tend to decompose and break up when heated and not only make the adjacent surfaces or faces of the sheets or plates rough, but also permit little spots here and there to be welded. It has therefore been necessary to provide a weld-preventing layer that will effectively prevent a welding action of the sheets between which it is interposed, and that will also prevent the giving off of oxidizing gases during the forming of members of the pack.

I have determined that lime sprayed on the faces of the stainless or non-corrosive plates that are not to be welded acts as a very efficient separator. This lime is sprayed on the surface to a thickness of substantially .004" to .005" after the plate has been heated to a temperature of approximately 700° F. When the desired thickness of coating has been obtained, a sharp gas flame is applied to the coating and the temperature of the lime raised to substantially 1300° F. driving off the water of hydration. At the same time, the lime (CaO) will absorb carbon dioxide from the gas flame and this will result in a hard coating (calcium carbonate) that will not flake off during subsequent handling and heating. When the package is then heated above 1800° F., all of the carbon dioxide will be driven off from the coating and such dioxide will in turn be decomposed into carbon monoxide by the excess of carbon present.

Lime when used as a separator thus offers three distinct advantages. It will not melt and run between the surfaces to be welded; it will absolutely prevent any adhesion between the plates even when they are being worked or rolled at 2300° F.; and it leaves a very bright, smooth surface that does not require anything to be done to it in order that it may be suitable for the purposes intended.

From the above description of my invention, it will appear that it has a broad scope and that it is not limited to any particular type of metal combination. That is, I have been the first to prevent the formation of and to provide for removing the scale from a closed pack of metal members by chemically combining the oxygen to provide a non-scale forming or non-oxidizing gas. I have been the first to provide a non-oxidizing gas in a pack to be rolled that has a suitable counter pressure and that is automatically replenished as needed to prevent an effective entry of oxygen from the outside of the pack or enclosure during a metal forming operation such as a hot working operation. I have also been the first to actually determine the basic reasons why previous attempts to successfully form a composite sheet, plate, etc., from two dissimilar metals such as a non-corrosive steel and a carbon steel, have not been successful. Further, I have been the first to work out a practical method based upon such discovery which makes it possible for the first time to inexpensively commercially fabricate sheets having a non-corrosive covering and a carbon steel core. I have also been the first to employ a non-oxidizing gas such as carbon monoxide in such a manner that carbon automatically eats up or absorbs by chemical reaction any oxygen present either in a free state or in an oxide state, as well as to automatically maintain a balance between the pressure existing within the pack and the pressure of the surrounding atmosphere in order to prevent the entry of additional oxygen.

Although for the purposes of illustration, I have shown several embodiments of my invention, it will be apparent to those skilled in the art that many modifications, adaptations, substitutions, additions and/or combinations thereof may be made without departing from the spirit and scope of my invention as indicated in the appended claims.

I claim:

1. The procedure for making composite sheets, strips, bars, and/or plates of metal which includes the steps of, forming a pack of at least two metal members, providing a carbonaceous material, closing off the material and adjacent portions of at least two members of the pack from the atmosphere, heating them to a temperature sufficient to cause carbon from the material to combine with any free oxygen and oxygen in any oxides present within the sealed pack to form carbon monoxide gas, and working the pack.

2. The procedure for making composite sheets, strips, bars, and/or plates of metal which includes the steps of forming a pack of metal members, pouring molten metal around the members and enclosing them, providing sufficient carbon within the enclosed pack to chemically combine and form a monoxide with oxygen of any oxide scale and of any free oxygen in the enclosed pack, heating the enclosed pack sufficiently to cause the formation of carbon monoxide, rolling the enclosed pack, and simultaneously, maintaining the carbon monoxide at a pressure sufficient to prevent an effective entry of oxygen from outside of the enclosed pack, so that the formation of scale will be prevented.

3. The procedure for making composite sheets, strips, bars, and/or plates which includes the steps of, providing at least two members, one of the members being of carbon steel and the other being a non-corrosive steel, providing a carbon layer between the two members, closing off the space between the two members, heating the members to a rolling temperature that is sufficient to cause the carbon to absorb any oxygen present within the closed off space, and then, rolling the pile to weld the two members into a composite member.

4. The procedure for making composite sheets, strips, bars, and/or plates of metal which includes the steps of, enclosing a non-corrosive metal member of at least .10% carbon within a carbon steel metal member of at least .15% carbon, exhausting air and oxygen from the enclosed members, heating the enclosed members sufficiently to cause at least some of the carbon to leave the members and combine with any free oxygen and with oxygen of any metal oxides present to form carbon monoxide, and rolling the members until they form a composite member.

5. The procedure for making composite sheets, strips, bars, and/or plates of metal which includes the steps of forming a pack of metal members of different characteristics such that two inner members are of substantially the same characteristics, placing a non-welding protective material between these two inner members, placing a carbonaceous material between at least two of members of substantially unlike characteristics, enclosing the pack and sealing it, heating the enclosed pack to a temperature sufficient to cause carbon in the carbonaceous material to combine with oxygen of any metal oxides and with any free oxygen present in the pack, pressing the pack in such a manner as to elongate it and to weld together at least two members of substantially unlike characteristics, and then, separating the pack along the line of the protective material.

6. The procedure for making composite sheets, strips, bars, and/or plates which includes the steps of, providing at least two members of non-corrosive steel and at least two members of carbon steel, the non-corrosive steel members having smaller dimensions than the carbon steel members, applying a weld-preventing coating to one face of at least one of the non-corrosive steel members, piling the two non-corrosive steel members in such a manner that the weld-preventing coating lies between their opposite faces, piling the two carbon steel members in such a manner that each lies adjacent a face of one of the non-corrosive steel members, providing an amorphous carbon layer between the faces of adjacent non-corrosive and carbon steel members, closing off the spacing between the members by welding their adjacent edges, heating the piled members to a hot working temperature, hot working the piled members, and then, separating the piled members into at least two members along a line represented by the weld-preventing coating.

7. The procedure for making composite sheets, bars, strips, and/or plates which includes the steps of, forming a pack comprising a low carbon steel member and a non-corrosive steel member and a high carbon steel member interposed therebetween, closing off the space between the members, heating the pack to a temperature and for a time sufficient to cause oxygen present to combine with carbon from the high carbon steel member and to form carbon monoxide, and then, working the pack to form a composite member.

8. The procedure for making composite sheets, strips, bars, and/or plates of metal which includes the steps of, providing pairs of members to be welded together, heating a face of at least one pair to a temperature of substantially 700 degrees F., spraying lime on the face to provide a weld-preventing coating, applying a sharp gas flame to the lime coating, raising the lime coating to substantially 1300 degrees F. and driving off all water of hydration and forming calcium carbonate, forming at least two pairs into a package with the lime coated face of one pack in abutment with a face of the other pack to prevent welding therebetween, closing off the pack, providing an excess of carbon in the pack, heating the pack to a hot working temperature until carbon dioxide is driven off from the coating, decomposing the carbon dioxide with the excess carbon into carbon monoxide, and working the pack to weld the members of each pair together.

9. A closed pack of metal members which includes at least two pairs of members to be welded together, said pairs forming a pile, a weld-preventing layer of calcium carbonate between faces of adjacent pairs, a weld-promoting carbonaceous layer between faces of the members of a pair, and means closing off the pile from the atmosphere.

10. In a procedure for making sheets, strips, bars, and/or plates of metal, the steps of forming a pack of metal members, reducing oxygen from scaled portions of members of the pack, providing sufficient non-scale forming gas in the pack to prevent oxygen from coming in contact with members of the pack, and working the pack.

11. In a procedure for making sheets, strips, bars, and/or plates of metal, the steps of forming a group of metal members, replacing oxygen in the group with a non-scale forming fluid entraining oxygen as a chemical combination, building such gas up to a pressure sufficient to prevent an effective entry of oxygen into the group, from a surrounding atmosphere and working the group.

12. In a procedure for making sheets, strips, bars, and/or plates of metal, the steps of forming a pack of metal members, providing an oxygen-absorbing non-oxidizing gas-producing agency in the pack, said agency being of a quantity in excess of that needed for mechanical requirements, activating such agency, and working the pack.

13. In a procedure for providing sheets, strips, bars and/or plates of metal, the steps of forming a pack of metal members, replacing oxygen in the pack with a non-scale forming gas, and continuing to replace oxygen with such gas while hot working the pack.

14. In a method of preventing the formation of and/or for removing metal oxide scale from a group of metal members being worked into a composite member, the step of replacing oxygen present in and entering the group during working of the group with a non-scale forming gas.

15. In a procedure for making composite sheets, strips, bars, and/or plates of metal, the steps of forming a pack of metal members, closing up the pack, providing a weld-inhibiting agency between at least two adjacent surfaces of the members of the pack while providing a weld-enhancing agency between two other adjacent surfaces of members of the pack, providing a gas producing agency in the pack, activating such agency by heating the pack, such agency when activated absorbing oxidizing gas present in or entering the pack and providing a non-oxidizing gas, and working the pack.

16. The procedure for making composite sheets, strips, bars, and/or plates of metal which includes the steps of, enclosing a non-corrosive metal member of at least .10% carbon within a carbon steel metal member of at least .15% carbon, heating the enclosed members sufficiently to cause at least some of the carbon to leave the members and combine with any free oxygen and with oxygen of any metal oxides present to form carbon monoxide, and rolling the members until they form a composite member.

17. An at least partially closed pack of metal members, which includes two pairs of members to be welded together, said pairs of forming a pile, a weld-preventing layer between faces of adjacent pairs, a layer of a non-oxidizing gas-producing and weld-promoting agency between faces of the members of a pair, and means at least partially closing off the pile from the atmosphere.

18. In a procedure for making sheets, strips, shapes, bars, and/or plates of metal, the steps of pouring carbon steel around a non-corrosive metal member to form a group of members, and providing an oxygen-absorbing non-oxidizing gas-producing agency near adjacent surfaces of the metal members of the group, said agency being of a quantity in excess of that needed for mechanical requirements, activating such agency, and working the pack.

19. In a method of preventing the formation of and/or for removing metal oxide scale from an at least partially closed-off metal member that is being suitably worked, the step of replacing oxygen present in and entering closed-off portions of the member with a non-scale forming gas while working the member.

20. In a procedure for making sheets, strips, bars, shapes, and/or plates of metal, the steps of forming a group of metal members, replacing oxygen in the group with an unsaturated gas such as carbon monoxide, and retaining the gas in the group while subjecting the group to a working operation.

21. In a procedure for making sheets, strips, bars, shapes, and/or plates of metal, the steps of forming a group of metal members, and maintaining a carbon monoxide atmosphere adjacent the group while subjecting the group to a hot working operation.

22. An at least partially closed off group of metal members having at least two members to be welded togetaher, a non-oxidizing gas-producing and weld-promoting agency within the group, and means associated with the group for suitably closing off the group from the atmosphere and for suitably retaining said agency within the group during the welding operation.

23. An at least partially closed off group of metal members including two members to be welded together, the group of members forming a pile, a non-oxidizing gas-producing and weld-promoting agency within the closed off group, said agency being provided in excess of mechanical requirements, and means associated with the group for suitably closing off the group from the atmosphere and for suitably retaining said agency within the group during the welding operation.

24. An at least partially closed off group of metal members as defined in claim 22 wherein said agency is a heat-sensitive carbonaceous material.

JOHN B. ORR, Jr.